United States Patent
Feng et al.

(10) Patent No.: US 12,164,895 B2
(45) Date of Patent: Dec. 10, 2024

(54) METHOD AND APPARATUS FOR APPLICATION DEPLOYMENT IN SOFTWARE-AS-A-SERVICE PLATFORM AND STORAGE MEDIUM

(71) Applicant: BOE Technology Group Co., Ltd., Beijing (CN)

(72) Inventors: Dandan Feng, Beijing (CN); Zhenjun Shao, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/789,046

(22) PCT Filed: Mar. 31, 2021

(86) PCT No.: PCT/CN2021/084652
§ 371 (c)(1),
(2) Date: Jun. 24, 2022

(87) PCT Pub. No.: WO2022/205160
PCT Pub. Date: Oct. 6, 2022

(65) Prior Publication Data
US 2024/0176605 A1 May 30, 2024

(51) Int. Cl.
*G06F 8/60* (2018.01)
*G06F 8/61* (2018.01)
(Continued)

(52) U.S. Cl.
CPC .................. *G06F 8/60* (2013.01); *G06F 8/61* (2013.01); *G06F 9/445* (2013.01); *H04L 63/08* (2013.01); *G06Q 30/06* (2013.01)

(58) Field of Classification Search
CPC ........ H04L 63/108; H04L 63/08; B60P 3/007; G06Q 30/0253; G06Q 30/06; G06F 8/60
See application file for complete search history.

(56) References Cited

U.S. PATENT DOCUMENTS

| 2015/0120440 A1* | 4/2015 | Jung | G06Q 30/0253 |
| | | | 705/14.51 |
| 2018/0330325 A1* | 11/2018 | Sibley | B60P 3/007 |
| 2019/0306169 A1* | 10/2019 | Statia | H04L 63/108 |

OTHER PUBLICATIONS

Hoey et al, CN 107004095, (translation), Feb. 5, 2021, 32 pgs <CN_107004095.pdf>.*

(Continued)

*Primary Examiner* — Tuan A Vu
(74) *Attorney, Agent, or Firm* — IPro, PLLC

(57) ABSTRACT

A method and apparatus for application deployment in a software-as-a-service platform and a storage medium are provided. A SaaS platform exists in a PaaS platform in an application form. The method includes: receiving order information of a user, wherein the order information includes an application identifier and delivery identifier of a designated application designated by the user, and the delivery identifier is configured to indicate a delivery mode of the designated application (101); determining relevant information for deploying the designated application according to the order information, wherein the relevant information includes the delivery identifier (102); sending the relevant information to the PaaS platform, so that the PaaS platform performs application deployment according to an application model corresponding to the relevant information so as to obtain the designated application, and sends a deployment result of the designated application to the SaaS platform (103); and receiving the deployment result, and providing corresponding feedback information to the user according to the deployment result (104).

19 Claims, 4 Drawing Sheets

(51) Int. Cl.
    *G06F 9/445*     (2018.01)
    *H04L 9/40*     (2022.01)
    *G06Q 30/06*     (2023.01)

(56) References Cited

OTHER PUBLICATIONS

Yi, Ren-Jie, CN 110134406, (translation), Aug. 16, 2019, 12 pgs <CN_110134406.pdf>.*
Dageville et al, CN 106104526, (translation), Oct. 12, 2016, 15 pgs <CN_106104526.pdf>.*
Wen Yun-long, CN 104793946, (translation), Jul. 22, 2015, 13 pgs <CN_104793946.pdf >.*
Lv, Yang-bo, CN 102360480, (translation), Jun. 16, 2017, 27 pgs <CN_102360480.pdf>.*
Li, Bin, CN 109979606, (translation), Jun. 23, 2020, 12 pgs <CN_109979606.pdf>:.*
Jiang et al, CN 106487850, (translation), Oct. 25, 2019, 34 pgs <CN_106487850.pdf>.*

\* cited by examiner

METHOD AND APPARATUS FOR APPLICATION DEPLOYMENT IN SOFTWARE-AS-A-SERVICE PLATFORM AND STORAGE MEDIUM

CROSS REFERENCE TO RELATED APPLICATIONS

The disclosure is a national phase entry under 35 U.S.C. § 371 of International Application No. PCT/CN2021/084652, filed on Mar. 31, 2021, the entire content of which is incorporated herein by reference.

TECHNICAL FIELD

The disclosure relates to the field of cloud computing, in particular to a method and apparatus for application deployment in a software-as-a-service platform and a storage medium.

BACKGROUND

With development of Internet technology, a new software application model has quietly emerged in the market as the application software matures.

Traditionally, a software vendor deploys a user-customized software product to a plurality of client terminals within an enterprise through authorization of a software authorization certificate to achieve software delivery. The disadvantage of this mode is that a user needs to purchase client terminals and requires professional personnel to maintain the client terminals. Specifically when the client terminals or a network fails, the professional personnel is required for maintenance, which costs a lot of manpower and material resources.

In a new software application model, an application is delivered to a user based on web page, while the application is deployed in a third party. The user only needs to purchase service in a software as a service (SaaS) application store and use the application through the web page without downloading the application to run locally, so there is no need to deploy the terminals for the application and professional personnel required for maintenance, thereby saving manpower and material resources.

SUMMARY

In a first aspect, a method for application deployment in a software-as-a-service platform according to an embodiment of the disclosure is applied to the software-as-a-service (SaaS) platform, the SaaS platform exists in a platform-as-a-service (PaaS) platform in an application form, and the method includes:
  receiving order information of a user, where the order information includes an application identifier and delivery identifier of a designated application designated by the user, and the delivery identifier is configured to indicate a delivery mode of the designated application;
  determining relevant information for deploying the designated application according to the order information, where the relevant information includes the delivery identifier;
  sending the relevant information to the PaaS platform, so that the PaaS platform performs the application deployment according to an application model corresponding to the relevant information so as to obtain the designated application, and sends a deployment result of the designated application to the SaaS platform; and
  receiving the deployment result of the designated application, and providing corresponding feedback information to the user according to the deployment result.

In one possible implementation, the determining the relevant information for deploying the designated application according to the order information includes:
  generating a call instruction according to the order information;
  sending the call instruction to an application library, so that the application library fetches description information of the designated application, where the application library is shared by the SaaS platform and the PaaS platform; and
  obtaining the description information from the application library, and using the description information and the delivery identifier as the relevant information.

In one possible implementation, before receiving the deployment result of the designated application, and providing the corresponding feedback information to the user according to the deployment result, the method further includes:
  determining a user operation performed by the user according to an operation identifier carried in the order information, wherein the user operation includes a purchase operation and a trial operation.

In one possible implementation, after the determining the user operation performed by the user, the method further includes:
  before determining the relevant information for deploying the designated application, if it is determined that the user operation is the purchase operation, returning to a payment page, so that the user pays on the payment page; and
  reviewing the order information after it is determined that the user completes payment on the payment page.

In one possible implementation, the providing the corresponding feedback information to the user according to the deployment result includes:
  when the delivery identifier is address delivery, the deployment result being an application address of the designated application locally deployed, taking the application address as the feedback information to be provided to the user, so that the user accesses the application through the application address;
  when the delivery identifier is mirror program delivery, the deployment result being a mirror file of the designated application, taking the mirror file as the feedback information to be provided to the user, so that the user installs the designated application in a desired environment through the mirror file; and
  when the delivery identifier is designated environment delivery, the order information further including an interface address of a container designated by the user; and the deployment result being that the designated application has been deployed in the container, taking a condition that the designated application has been deployed in the container as the feedback information to be provided to the user so as to notify the user that the designated application has been deployed in the container.

In one possible implementation, after receiving the deployment result of the designated application, and providing the corresponding feedback information to the user according to the deployment result, the method further includes:

when the delivery identifier is the address delivery, if an application type of the designated application is a multi-tenant application, creating a corresponding user account and password when receiving the next new order for purchasing the designated application; and returning the user account and password and an address of the designated application to the user corresponding to the new order.

In one possible implementation, the creating the corresponding user account and password includes:

automatically allocating the user account and password to the user corresponding to the new order; and encapsulating the user account and password in a tenant interface of the designated application.

In one possible implementation, after returning the user account and password and the address of the designated application to the user corresponding to the new order, the method further includes:

periodically detecting a validity period of the user account; and when it is detected that the validity period of the user account has expired and a fee is not renewed, setting the user account to be in an invalid state, so that the user account cannot be accessed.

In a second aspect, an embodiment of the disclosure provides a method for application deployment in a software-as-a-service platform, applied to a platform-as-a-service (PaaS) platform, wherein the PaaS platform includes the software-as-a-service (SaaS) platform existing in an application form, and the method includes:

receiving relevant information for deploying a designated application sent by the SaaS platform, where the designated application is determined from order information received from the SaaS platform, and the relevant information includes a delivery identifier of the designated application;

performing the application deployment through a corresponding application model according to the relevant information so as to obtain the designated application; and sending a deployment result of the designated application to the SaaS platform, so that the SaaS platform provides corresponding feedback information to a user corresponding to the order information according to the deployment result.

In one possible implementation, the performing the application deployment through the corresponding application model according to the relevant information so as to obtain the designated application includes:

obtaining the application model from an application model library according to the relevant information;

determining a deployment location of the designated application according to the delivery identifier; and deploying the designated application in the deployment location through the application model so as to obtain the designated application.

In one possible implementation, when the delivery identifier is address delivery or mirror program delivery, the deployment location is local; and when the delivery identifier is designated environment delivery, the relevant information further including an interface address of a container designated by the user, and the deployment location is the container.

In one possible implementation, after obtaining the designated application, the method further includes:

when the delivery identifier is the mirror program delivery, generating a corresponding mirror file after obtaining the designated application.

In one possible implementation, the deploying the designated application in the deployment location through the application model so as to obtain the designated application includes:

when the delivery identifier is the designated environment delivery, deploying the designated application in the container through the application model so as to obtain the designated application.

In one possible implementation, the deploying the designated application in the deployment location through the application model so as to obtain the designated application includes:

when the delivery identifier is the address delivery, extracting resource information required by the designated application from the application model;

judging whether a remaining resource in an underlying resource meets a resource requirement in the resource information; and if yes, obtaining a resource corresponding to the resource information from the underlying resource, and deploying the designated application on the resource, so as to obtain the designated application.

In one possible implementation, after judging whether the remaining resource in the underlying resource meets the resource requirement in the resource information, the method further includes:

if the remaining resource does not meet the resource requirement in the resource information, returning error information to the SaaS platform so as to prompt that the designated application deployment fails.

In one possible implementation, before performing the application deployment through the corresponding application model according to the relevant information, so as to obtain the designated application, the method further includes:

after the application model of the designated application is created, pushing the designated application to an application library, so that the designated application is published in an application store of a corresponding merchant.

In one possible implementation, before pushing the designated application to the application library, the method further includes:

receiving merchant information registered in the SaaS platform by the merchant who creates the application model and configuration information of the created application store; and configuring a delivery environment corresponding to the application store in the PaaS platform according to the merchant information and the configuration information of the application store, and associating the application store.

In a third aspect, an embodiment of the disclosure provides an apparatus for application deployment in a software-as-a-service platform, applied to the software-as-a-service (SaaS) platform. The SaaS platform exists in a platform-as-a-service (PaaS) platform in an application form, and the apparatus includes:

a receiving unit, configured to receive order information of a user, where the order information includes an application identifier and delivery identifier of a designated application designated by the user, and the delivery identifier is configured to indicate a delivery mode of the designated application;

an obtaining unit, configured to determine relevant information for deploying the designated application according to the order information, where the relevant information includes the delivery identifier;

a deploying unit, configured to send the relevant information to the PaaS platform, so that the PaaS platform performs the application deployment through a corresponding application model according to the relevant information so as to obtain the designated application, and sends a deployment result of the designated application to the SaaS platform; and a sending unit, configured to receive the deployment result of the designated application, and provide corresponding feedback information to the user according to the deployment result.

In one possible implementation, the obtaining unit is specifically configured to:

generate a call instruction according to the order information;

send the call instruction to an application library, so that the application library fetches description information of the designated application, where the application library is shared by the SaaS platform and the PaaS platform; and obtain the description information from the application library, and use the description information and the delivery identifier as the relevant information.

In one possible implementation, the obtaining unit is further configured to:

determine a user operation performed by the user according to an operation identifier carried in the order information, wherein the user operation includes a purchase operation and a trial operation.

In one possible implementation, the obtaining unit is further configured to:

before determining the relevant information for deploying the designated application, if it is determined that the user operation is the purchase operation, return to a payment page, so that the user pays on the payment page; and review the order information after it is determined that the user completes payment on the payment page.

In one possible implementation, the sending unit is further configured to:

when the delivery identifier is address delivery, the deployment result being an application address of the designated application locally deployed, take the application address as the feedback information to be provided to the user, so that the user accesses the application through the application address;

when the delivery identifier is mirror program delivery, the deployment result being a mirror file of the designated application, take the mirror file as the feedback information to be provided to the user, so that the user installs the designated application in a desired environment through the mirror file; and when the delivery identifier is designated environment delivery, the order information further including an interface address of a container designated by the user; and the deployment result being that the designated application has been deployed in the container, take a condition that the designated application has been deployed in the container as the feedback information to be provided to the user so as to notify the user that the designated application has been deployed in the container.

In one possible implementation, the obtaining unit is further configured to:

when the delivery identifier is the address delivery, if an application type of the designated application is a multi-tenant application, create a corresponding user account and password when receiving the next new order for purchasing the designated application; and return the user account and password and an address of the designated application to the user corresponding to the new order.

In one possible implementation, the obtaining unit is further configured to:

automatically allocate the user account and password to the user corresponding to the new order; and encapsulate the user account and password in a tenant interface of the designated application.

In one possible implementation, the apparatus further includes a detecting unit, and the detecting unit is configured to:

periodically detect a validity period of the user account; and when it is detected that the validity period of the user account has expired and a fee is not renewed, set the user account to be in an invalid state, so that the user account cannot be accessed.

In a fourth aspect, an embodiment of the disclosure provides an apparatus for application deployment in a software-as-a-service platform, applied to a platform-as-a-service (PaaS) platform. The PaaS platform includes the software-as-a-service (SaaS) platform existing in an application form, and the apparatus includes:

a receiving unit, configured to receive relevant information for deploying a designated application sent by the SaaS platform, where the designated application is determined from order information received from the SaaS platform, and the relevant information includes a delivery identifier of the designated application;

a deploying unit, configured to perform the application deployment through a corresponding application model according to the relevant information so as to obtain the designated application; and a sending unit, configured to send a deployment result of the designated application to the SaaS platform, so that the SaaS platform provides corresponding feedback information to a user corresponding to the order information according to the deployment result.

In one possible implementation, the deploying unit is configured to:

obtain the application model from an application model library according to the relevant information;

determine a deployment location of the designated application according to the delivery identifier; and deploy the designated application in the deployment location through the application model so as to obtain the designated application.

In one possible implementation, when the delivery identifier is address delivery or mirror program delivery, the deployment location is local; and when the delivery identifier is designated environment delivery, the relevant information further including an interface address of a container designated by the user, and the deployment location is the container.

In one possible implementation, the deploying unit is further configured to:
  when the delivery identifier is the mirror program delivery, generate a corresponding mirror file after obtaining the designated application.

In one possible implementation, the deploying unit is further configured to:
  when the delivery identifier is the designated environment delivery, deploy the designated application in the container through the application model so as to obtain the designated application.

In one possible implementation, the deploying unit is further configured to:
  when the delivery identifier is the address delivery, extract resource information required by the designated application from the application model;
  judge whether a remaining resource in an underlying resource meets a resource requirement in the resource information; and
  if yes, obtain a resource corresponding to the resource information from the underlying resource, and deploy the designated application on the resource so as to obtain the designated application.

In one possible implementation, the deploying unit is further configured to:
  if the remaining resource does not meet the resource requirement in the resource information, return error information to the SaaS platform so as to prompt that the designated application deployment fails.

In one possible implementation, the apparatus further includes a publishing unit, and the publishing unit is configured to:
  after the application model of the designated application is created, push the designated application to an application library, so that the designated application is published in an application store of a corresponding merchant.

In one possible implementation, the publishing unit is further configured to:
  receive merchant information registered in the SaaS platform by the merchant who creates the application model and configuration information of the created application store; and
  configure a delivery environment corresponding to the application store in the PaaS platform according to the merchant information and the configuration information of the application store, and associate the application store.

In a fifth aspect, an embodiment of the disclosure further provides an apparatus for application deployment in a software-as-a-service platform, including:
  at least one processor, and
  a memory connected with the at least one processor, where
  the memory stores an instruction capable of being executed by the at least one processor, and the at least one processor executes the method according to the above first aspect by executing the instruction stored in the memory.

In a sixth aspect, an embodiment of the disclosure further provides a readable storage medium, including:
  a memory, where
  the memory is configured to store an instruction, and the instruction, when executed by a processor, enables an apparatus including the readable storage medium to complete the method according to the above first aspect.

DETAILED DESCRIPTION

Figure 1:
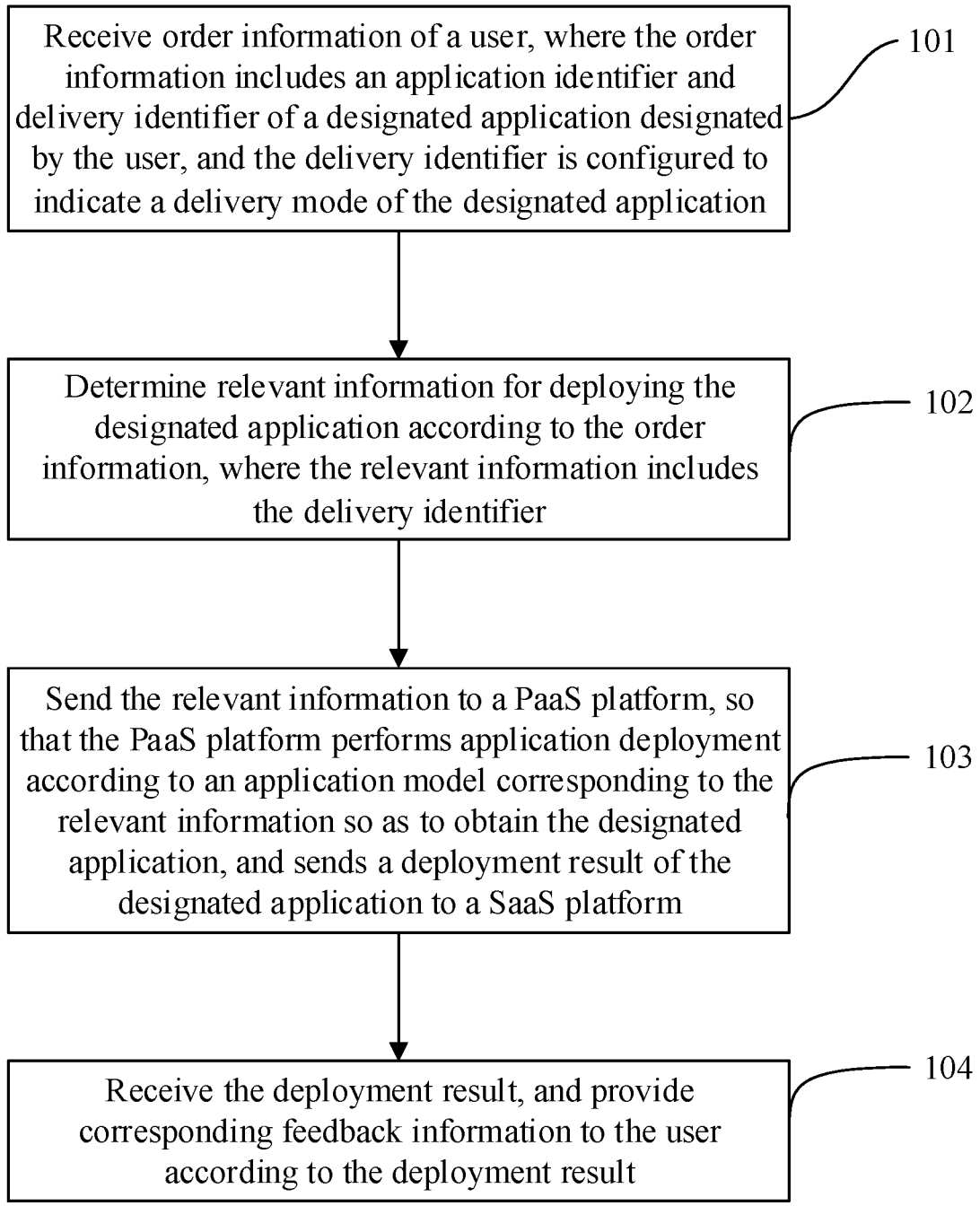
FIG. 1 is a flow chart of a method for application deployment in a software-as-a-service (SaaS) platform at the SaaS side according to an embodiment of the disclosure.

At present, a SaaS platform plays an actual role in only providing a merchant with a function of receiving a user order. It takes a long waiting period from initiating the order by a user to delivery of an application by the merchant (such as application function communication, code writing, testing, etc.), which makes it impossible for the user to obtain the delivered application in time after purchasing the application.

Embodiments of the disclosure provide a method and apparatus for application deployment in a software-as-a-service platform, and a storage medium, for solving the above technical problems existing in the related art.

Platform as a Service (PaaS) is a service for providing a server platform or development environment through a network.

Software as a Service (SaaS) is a service for providing a program through the network.

Software multitenancy is a software architecture in which a single instance of software serves multiple tenants, and each user is called a tenant. Users can customize some features, such as notifications or themes, but core application code remains intact and cannot be changed by tenants.

The instance refers to an actual object that the application processes.

In order to better understand the above technical solutions, the technical solutions of the disclosure will be described in detail below through accompanying drawings and specific embodiments. It should be understood that the embodiments of the disclosure and the specific features in the embodiments are detailed descriptions of the technical solutions of the disclosure, rather than limitation to the technical solutions of the disclosure. The embodiments of the disclosure and the technical features in the embodiments can be mutually combined in a case of no conflict.

In the embodiments provided by the disclosure, the PaaS platform mainly provides services such as a basic resource, service monitoring, and resource scheduling for construction and release of the software. The SaaS platform mainly provides user management, application query, application configuration and other services directly facing the users for an enterprise merchant (merchant for short in the disclosure), an enterprise customer (user for short in the disclosure) and operations. The PaaS platform is oriented to development and operation and maintenance personnel of the enterprise merchant for allowing a developer to configure, code, deploy and run the software, while the SaaS platform is mainly oriented to the enterprise merchant and the enterprise customer. The enterprise merchant operates opened stores (referred to as an application store in the disclosure) on the SaaS platform, operates and maintains applications on the store, and maintains a delivery environment, etc., and the enterprise customer queries, views, purchases, and experiences the application on the SaaS platform.

The following will first describe a method for application deployment in the SaaS platform at a SaaS platform side, and then describe the method for application deployment in the SaaS platform at a PaaS platform layer.

Please refer to FIG. 1, an embodiment of the disclosure provides a method for application deployment in a software-as-a-service platform according to an embodiment of the disclosure, applied to the software-as-a-service (SaaS) platform. The SaaS platform exists in a platform-as-a-service (PaaS) platform in an application form, and a processing process of the method is as follows.

Step 101: order information of a user is received, where the order information includes an application identifier and delivery identifier of a designated application designated by the user, and the delivery identifier is configured to indicate a delivery mode of the designated application.

Step 102: relevant information for deploying the designated application is determined according to the order information, where the relevant information includes the delivery identifier.

Step 103: the relevant information is sent to the PaaS platform, so that the PaaS platform performs the application deployment according to an application model corresponding to the relevant information so as to obtain the designated application, and sends a deployment result of the designated application to the SaaS platform.

Step 104: the deployment result is received, and corresponding feedback information is provided to the user according to the deployment result.

In the embodiment provided by the disclosure, the SaaS platform is deployed on the PaaS platform as a complete application, and resource interaction between the two platforms is realized through an underlying container technology (such as kubernetes), so that a basic condition is provided for one-click generation of the application (that is, the designated application designated by users) that the user needs to purchase from the SaaS platform.

For example, a plurality of applications are displayed in an application store of a certain merchant of the SaaS platform, and the user generates corresponding order information by operating a selected application 1 (designated application) in the application store. The order information includes a name, type, package, version, quantity, delivery identifier and the like of the application 1. After receiving the order information, the SaaS platform determines the relevant information for deploying the designated application according to the order information.

The delivery identifier may include, for example, address delivery in which delivery is performed through a URL address, and the user accesses the designated application through the URL address; or mirror program delivery in which a mirror file of designated application is delivered to the user, and the user may install the designated application in the environment required by the user (for example, the user may install it on a certain computer, server, cloud, etc.) through the mirror file; or designated environment delivery in which the user may provide an interface address of a container, and the designated application may be deployed in the corresponding container through the interface address. The container may be a container on which an operating system has been deployed, or a container corresponding to a process in the operating system, and the container is usually configured to deploy one application.

The determining the relevant information for deploying the designated application according to the order information may be implemented by adopting the following modes:

a call instruction is generated according to the order information, where the call instruction includes the relevant information; the call instruction is sent to an application library, so that the application library calls description information of the designated application, where the application library is shared by the SaaS platform and the PaaS platform; and the description information is obtained from the application library, and the description information and the delivery identifier are taken as the relevant information.

For example, if the order information includes the name, type, package, version, and delivery identifier of the application 1, the call instruction includes the application identifier of the designated application that needs to be called, and the SaaS platform sends the call instruction to the application library, so that the application library calls the description information of the application 1, obtains the description information from the application library, and takes the description information and the delivery identifier of the designated application as the relevant information of the designated application to be sent to the PaaS platform. Thus the PaaS platform performs application deployment according to the application model corresponding to the relevant information so as to obtain the designated application, and sends the deployment result of the designated application to the SaaS platform. After receiving the deployment result of the designated application, the SaaS platform provides corresponding feedback information to the user according to the deployment result, so that the user may provide the application to a sub-user of this user for access.

In one possible implementation, before the address of the designated application is received and provided to the user, a user operation performed by the user may further be determined according to an operation identifier carried in the order information, where the user operation includes a purchase operation and a trial operation.

The user operation performed by the user may be determined according to the operation identifier carried in the order information after receiving the order information. For example, it is determined that the user operation performed by the user is the purchase operation according to the operation identifier carried in the order information after receiving the order information.

The user operation performed by the user may also be determined according to the operation identifier carried in the order information after receiving the address of the designated application. For example, it is determined that the user operation performed by the user is the trial operation according to the operation identifier carried in the order information after receiving the address of the designated application.

In one possible implementation, after determining the user operation performed by the user and before determining the relevant information for deploying the designated application, if it is determined that the user operation is the purchase operation, return to a payment page, so that the user pays on the payment page; and after determining that the user completes payment on the payment page, the order information is reviewed.

For example, the corresponding order information is generated after the user operation of purchasing an application 2. After the SaaS platform receives the order information, if it is determined that the user operation is the purchase operation according to the operation identifier carried in the order information, return to the payment page, so that the user pays on the payment page; and after it is determined that the user completes payment, the order information further needs to be reviewed. After the review is passed, the relevant information of the application 2 is determined according to the order information, and then step 103 and step 104 are executed.

Before determining the relevant information for deploying the designated application, if it is determined that the user operation is the purchase operation, return to the payment page, so that the user pays on the payment page. After it is determined that the user completes payment on the payment page, the order information is reviewed. After it is determined that the user performs a substantial purchase operation, the designated application is deployed. Compared with a mode of deploying the designated application first and then requiring the user to pay, a problem that the user places an order without paying (for example, after placing the order, the purchase of the designated application is abandoned by non-payment), and consequently, resource waste is caused by deploying the designated application can be effectively prevented.

In one possible implementation, the providing the corresponding feedback information to the user according to the deployment result includes the following cases:

when the delivery identifier is address delivery, the deployment result is an application address of the designated application locally deployed, the application address is taken as the feedback information to be provided to the user, so that the user accesses the application through the application address.

For example, when the delivery identifier is the address delivery, after the PaaS platform deploys the designated application locally (that is, in an environment corresponding to the merchant), a URL address of the designated application (that is the application address) will be returned to the SaaS platform, and the SaaS platform provides the above URL address to the user, so that the user may access the designated application through the URL address.

When the delivery identifier is mirror program delivery, the deployment result is a mirror file of the designated application, and the mirror file is taken as the feedback information to be provided to the user, so that the user installs the designated application in a desired environment through the mirror file.

For example, when the delivery identifier is the mirror program delivery, after the PaaS platform deploys the designated application locally (that is, in the environment corresponding to the merchant), the corresponding mirror file is generated and sent to the SaaS platform, and the SaaS platform takes the mirror file as the feedback information to be provided to the user, so that the user may install the designated application in the environment required by the user through the mirror file.

When the delivery identifier is designated environment delivery, the order information further includes an interface address of a container designated by the user; and the deployment result is that the designated application has been deployed in the container, a condition that the designated application has been deployed in the container is taken as the feedback information to be provided to the user so as to notify the user that the designated application has been deployed in the container.

For example, when the delivery identifier is the designated environment delivery, when the PaaS platform performs application deployment by using the application model of the designated application, the designated application is deployed in the container provided by the user according to the interface address of the container provided by the user, and the deployment result that the designated application has been deployed in the above container is sent to the SaaS platform, and the SaaS platform returns to the user feedback information that the designated application has been deployed in the container provided by the user according to the above deployment result, so that the user knows the deployment result of the designated application.

In one possible implementation, after receiving the deployment result, and providing the corresponding feedback information to the user according to the deployment result, the method further includes:

when the delivery identifier is the address delivery, if an application type of the designated application is a multi-tenant application, a corresponding user account and password are created when receiving the next new order for purchasing the designated application; and the user account and password and the address of the designated application are returned to the user corresponding to the new order.

When the designated application is developed, the designated application is set to be a multi-tenant mode, and thus the designated application may become a multi-tenant application. Implementation forms of the multi-tenant mode include three modes of independent database and shared database, independent schema and shared schema, independent data table and shared data table.

For example, after a user A obtains the address of the application 1 and uses the application 1, the application 1 is the multi-tenant application, and a user B also purchases the application 1, and generates order information of the user B. After receiving the order information, the SaaS platform determines that the application 1 is the multi-tenant application. Since the application 1 has been deployed, there is no need to redeploy. A corresponding user account and password are created in the application 1 for the user B, and the user account and password and the address of the application 1 are returned to the user B, to make the user log in the application 1 with the user account and password.

By setting the designated application to be the multi-tenant mode, the designated application becomes the multi-tenant application. Tenant isolation may be achieved in a mode of allocating the user account and password to the users, and the same application is avoided to be redeployed to the user, thereby reducing resource waste.

In one possible implementation, the creating the corresponding user account and password may be implemented by adopting the following modes:

the user account and password are automatically allocated to the user corresponding to the new order; and the user account and password are encapsulated in a tenant interface of the designated application.

For example, a background of the SaaS platform calls a create tenant interface of a multi-tenant application program through an http protocol to create the tenant. A tenant interface is defined as follows:

```
/openapi/register
parameter:
{
    "user": user name,
    "password": password,
    "company": company
}
``` and the account (sent_tele@tele.com) and password (fdfi$ongj) are automatically allocated to the user B.

After that, the background exposes the address of the application 1 to the SaaS platform, meanwhile returns a JSON format account and password, and the returned information may be expressed as follows:

{"appUrl":"http://xxx.boe.com.cn","tenentName": "sent_tele@tele.com","password":"fdfi$ongj"}

The SaaS platform packs the above information and returns it to the user, so that the user uses the returned account and password to access the application 1.

In one possible implementation, after returning the user account and password and the address of the designated application to the user corresponding to the new order, a validity period of the user account may further be detected periodically; and when it is detected that the validity period of the user account has expired and a fee is not renewed, the user account is set to be in an invalid state, so that the user account cannot be accessed.

For example, the user purchases the application 1 for one year. After the user purchases the application, a validity period of an implicit account corresponding to the user may be detected periodically. When it is detected that the validity period of the user account has expired and the user account is not renewed, the user account is set to be in the invalid state, so that the user cannot access the user account. When the user accesses the user account, the user may be prompted to renew the fee. After the user successfully renews the fee, the user account is set to be in a valid state for the user to access.

The method for application deployment in the software-as-a-service platform is introduced at the SaaS platform side, and the following will make introduction at the PaaS platform side.

Figure 2:
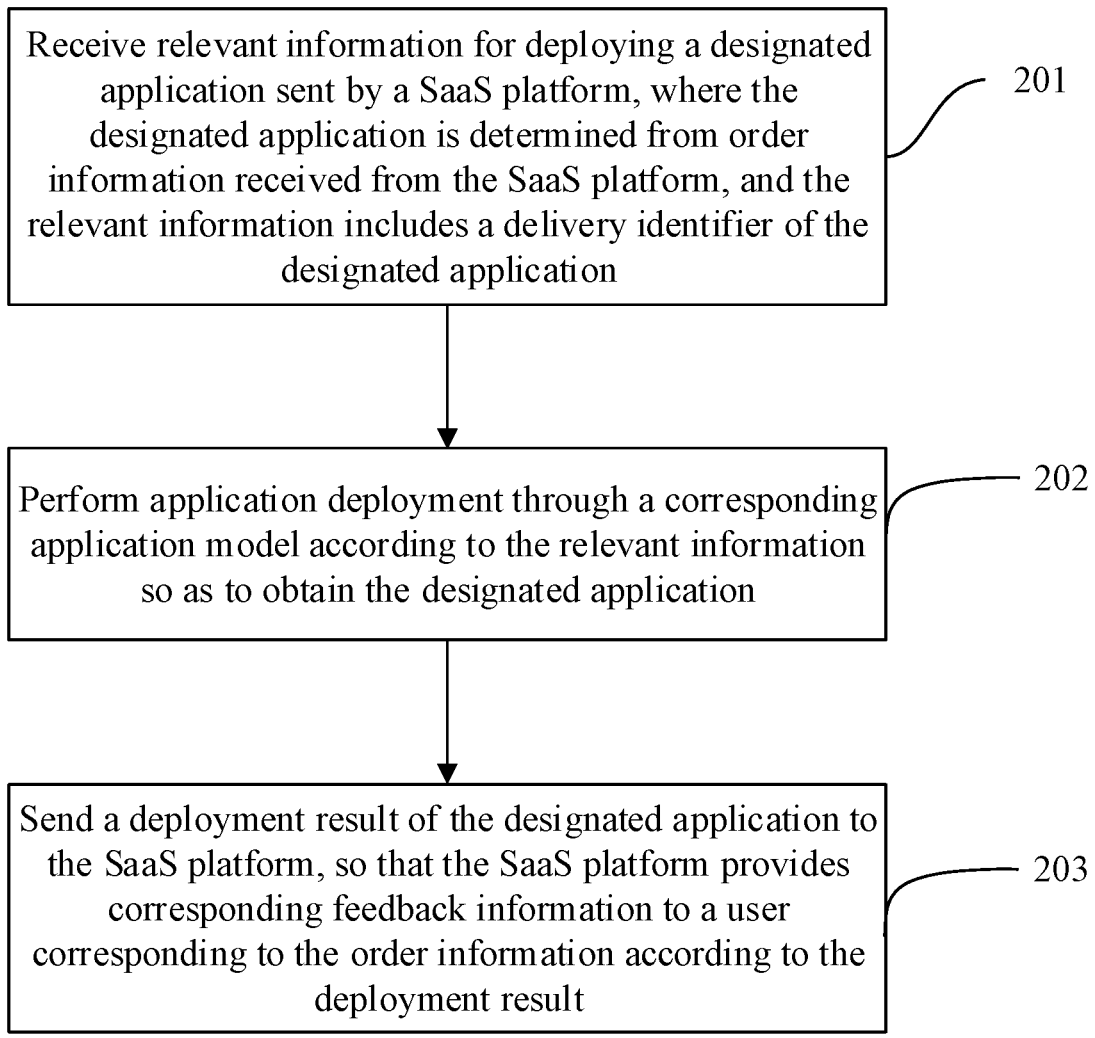
FIG. 2 is a flow chart of a method for application deployment in a SaaS platform on a PaaS side according to an embodiment of the disclosure.

Based on the same inventive concept, an embodiment of the disclosure provides a method for application deployment in a software-as-a-service platform, applied to a platform-as-a-service (PaaS) platform. The PaaS platform includes the software-as-a-service (SaaS) platform existing in an application form. Please refer to FIG. 2, the method includes the following.

Step 201: relevant information for deploying a designated application sent by the SaaS platform is received, where the designated application is determined from order information received from the SaaS platform, and the relevant information includes a delivery identifier of the designated application.

Step 202: application deployment is performed through a corresponding application model according to the relevant information so as to obtain the designated application.

Step 203: a deployment result of the designated application is sent to the SaaS platform, so that the SaaS platform provides corresponding feedback information to a user corresponding to the order information according to the deployment result.

For example, after the user places an order through the SaaS platform to purchase an application A, the SaaS platform determines relevant information for deploying the application A according to order information of the application A, and the relevant information contains a delivery identifier of the application A, and is sent to the PaaS platform. After receiving the relevant information of the application A sent by the SaaS platform, the PaaS platform performs application deployment through a corresponding application model according to the relevant information to obtain the running application A, and sends a deployment result of the application A to the SaaS platform, so that the SaaS platform provides the corresponding feedback information to the user corresponding to the order information according to the deployment result.

The order information of a user software service (designated application) is received through the SaaS platform, the corresponding relevant information for deploying the designated application is determined according to the order information, and then the relevant information is sent to the PaaS platform, so that the PaaS platform immediately completes deployment of the designated application. After deployment is completed, delivery of the designated application is completed through the SaaS platform, so as to realize platform integration of software service delivery, effectively save a software compilation efficiency and construction time, and realize real-time delivery. That is, an automatic deployment and delivery flow of the application can be started after the application is purchased without user participation and waiting.

Since the application model is adopted for deploying the designated application, the designated application may be automatically deployed on the PaaS platform, and a process of one publishing and unlimited automatic replication of the designated application may also be realized.

In one possible implementation, the performing the application deployment through the corresponding application model according to the relevant information so as to obtain the designated application may be implemented by adopting the following modes:

the application model is obtained from an application model library according to the relevant information; a deployment location of the designated application is determined according to the delivery identifier; and the designated application is deployed at the deployment location through the application model so as to obtain the designated application.

The determining the deployment location of the designated application according to the delivery identifier includes the following cases:

when the delivery identifier is address delivery or mirror program delivery, the deployment location is a local location; and when the delivery identifier is designated environment delivery, the relevant information further includes an interface address of a container designated by the user, and the deployment location is the container.

For example, if the delivery identifier is the address delivery or the mirror program delivery, the deployment location is local (an environment of a merchant), and the designated application is deployed locally through the application model.

If the delivery identifier is the designated environment delivery, the deployment location is the container designated by the user, and the designated application is deployed in the container designated by the user through the application model. The container may be a system environment that can deploy a plurality of applications, or an application container that can deploy one application, and the application container is used as a process in the system environment.

The deploying the designated application in the deployment location through the application model so as to obtain the designated application includes the following implementations.

A first mode: when the delivery identifier is the designated environment delivery, the designated application is deployed in the container through the application model so as to obtain the designated application.

A second mode: when the delivery identifier is the mirror program delivery, the designated application is deployed locally through the application model, and a corresponding mirror file is generated after obtaining the designated application.

Sale information of the designated application shown in a store of the merchant of the SaaS platform includes basic resource information required by deploying the designated application. When the user decides to purchase the designated application and needs to deploy the designated application to the container designated by the user, the user may configure resources of the container provided by the user according to the above basic resource information, and provides an interface address of the container when placing an order, so that the PaaS platform may deploy the designated application in the container provided by the user when performing the application deployment.

A third mode: when the delivery identifier is the address delivery, the resource information required by the designated application is extracted from the application model; whether a remaining resource in an underlying resource matches the resource required in the resource information is judged; if yes, the resource corresponding to the resource information is obtained from the underlying resource, and the designated application is deployed on the resource so as to obtain the designated application.

Application models of the application that has been developed are stored in an application model library. These application models include environment information, codes, configuration information and the like required for deploying the application. Through the application model, resources, components, and a logical relationship between the components required for deploying the application can be determined.

Before deploying the designated application, by judging whether the remaining resource in the underlying resource meets the resource requirement for deploying the designated application, and the required resource is obtained for application deployment only when it is determined to meet the resource requirement, which can prevent a problem of failure of the application deployment due to the insufficient underlying resource.

For example, after receiving the relevant information for deploying the application A sent by the SaaS platform, the PaaS platform obtains an application model A corresponding to the application A from the application model library, then extracts the environment information, codes, configuration information and other information which are required for deploying the application A from the application model A, and automatically schedules the application resource information required for deploying the application A from a cluster. When it is determined that the resource required for deploying the application A (that is, the resource corresponding to the application resource information) does not exceed the remaining resource in the underlying resource, the underlying resource is made to allocate the corresponding resource to the application A, such as CPU, a storage space, etc. The SaaS platform automatically deploys the applications on these resources provided by the underlying resource, and returns an address of the application to the user through the SaaS platform after the deployment of the application A is completed.

It should be noted that when the delivery identifier is mirror application delivery, a process of locally deploying the designated application is similar to the above process, which indicates that the corresponding mirror file further needs to be generated after the deployment is finally completed.

In one possible implementation, after judging whether the remaining resource in the underlying resource meets the resource requirement in the resource information, if the remaining resource does not meet the resource requirement in the resource information, error information is returned to the SaaS platform to prompt that the designated application deployment fails.

If it is determined that the resource for deploying the application A exceeds the remaining resource in the underlying resource, the PaaS platform may return the error information to the SaaS platform so as to prompt that the application A fails to be deployed. If the application A is an application for which the user has paid for the purchase, the SaaS platform may ask the user whether to choose a refund or continue to wait.

In one possible implementation, before performing the application deployment through the corresponding application model according to the relevant information so as to obtain the designated application, and after creating the application model of the designated application, the designated application is pushed to an application library, so that the designated application is published in an application store of a corresponding merchant.

When the merchant develops the application on the PaaS platform, components required by the application are constructed through a source code/dockerfile/jar package and other modes, environment information for application startup is configured, a relevant container mirror list is generated in the mirror repository, a dependency relationship and startup sequence of the components are arranged according to an application logic to form a deployment architecture and a description file of the entire application, thereby completing the construction of the application model. After the application model is constructed, the corresponding application may be automatically started according to the application model, and supports one-click installation.

For example, after a merchant A completes coding, testing and the like of an application B on the PaaS platform, the application B runs to generate the corresponding application model, and the application B is pushed to the application library. Since the application library is shared by the PaaS platform and the SaaS platform, the application B is pushed to the application library on the PaaS platform, so that the application B may be seen on the SaaS platform, and then the application B is published to the store of the merchant A.

In one possible implementation, before pushing the designated application to the application library, merchant information registered in the SaaS platform by the merchant who creates the application model and configuration information of the created application store are received; and a delivery environment corresponding to the application store on the PaaS platform is configured according to the merchant information and the configuration information of the application store, and the application store is associated.

For example, before the merchant A pushes the application B to the application library, if there is no application store of the merchant A in the SaaS platform, or if the merchant A wants to place the application B in a new application store for selling, the merchant A may register the merchant information (such as a merchant account, password, etc.) in the SaaS platform, and obtain the configuration information of the newly created application store; after that, the merchant A configures the delivery environment corresponding to the application store on the PaaS platform according to the above merchant information and the configuration information of the newly created application store, and the application store is associated. For example, the merchant information and the configuration information may be carried in AccessKey, and the application stores of the PaaS platform and the SaaS platform are associated by using the AccessKey. The AccessKey is used for identification between the PaaS platform and the SaaS platform, and is an authentication technology between systems.

Then the application is published to the application library of the application store of the application A, so that the merchant may find the application B in its application store. A user A may edit and manage the to-be-published application B in the background of the application store. For example, the user may set parameters such as a package, a period, and an application type (trial or purchase) of the application B as needed. The SaaS platform may synchronously send the information to the PaaS platform, so that the PaaS platform automatically adjusts the instance quantity of services, system resources and the like according to these parameters so as to provide better system performance and throughput. After the merchant sets the application B to be listed on the SaaS platform, the user can see the listed application in the application store of the merchant for the user to view, purchase or try.

In order to make those skilled in the art to fully understand the above solution, an actual example is provided below for illustration.

Figure 3:
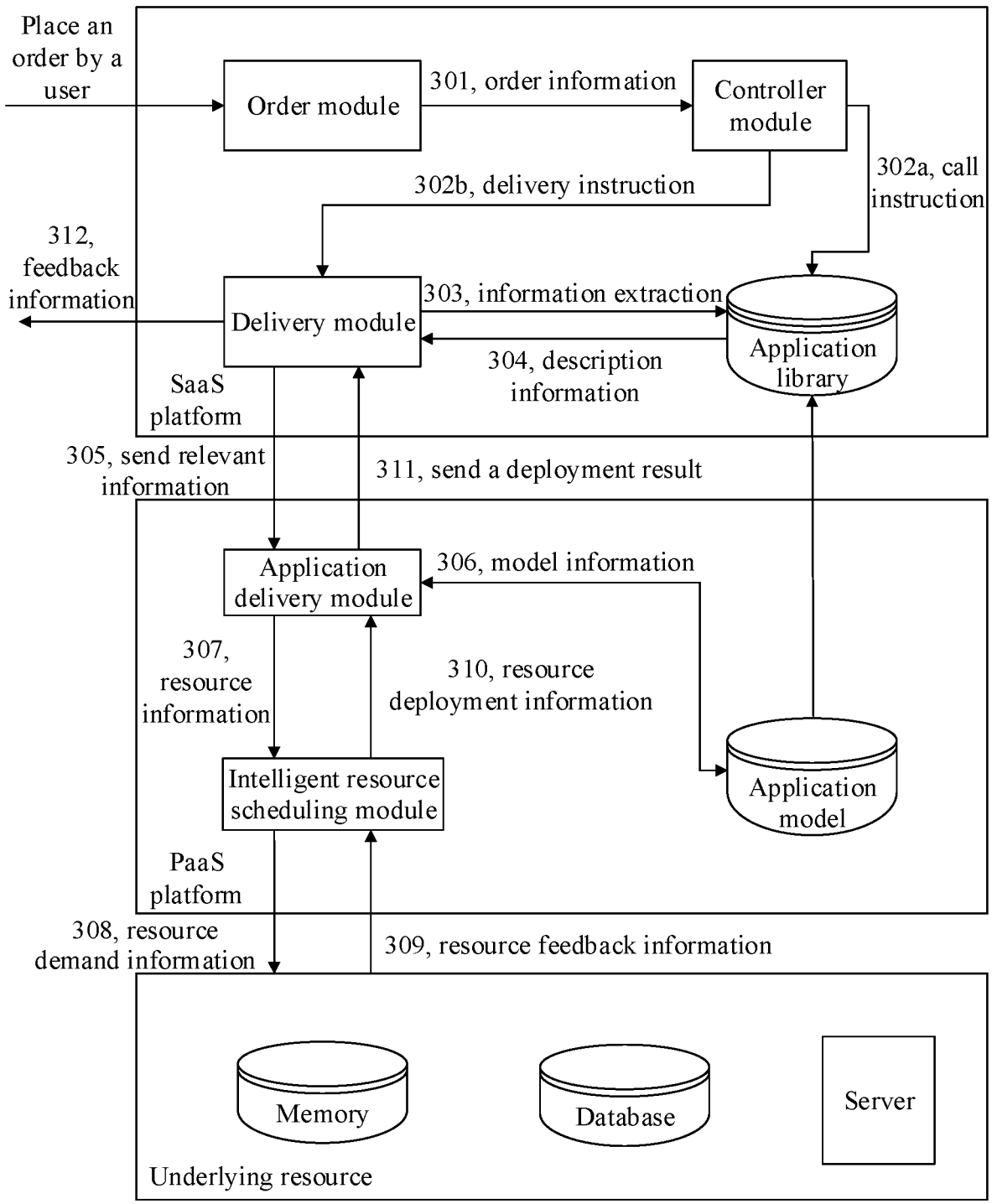
FIG. 3 is a flow chart illustrating interaction between a PaaS platform and a SaaS platform according to an embodiment of the disclosure.

Please refer to FIG. 3, which is a flow diagram of interaction between the PaaS platform and the SaaS platform provided by the embodiment of the disclosure. FIG. 3 takes an example that the delivery identifier is the address delivery, and other delivery modes are similar to this, and are not repeated.

In FIG. 3, the SaaS platform is divided into an order module, a controller module and a delivery module, and the PaaS platform is divided into an application delivery module, an intelligent resource scheduling module, and an application model. The SaaS platform and the PaaS platform share the application library, and the underlying resource (or called a cluster resource) mainly includes a memory, a database, a server, etc.

After the user places the order on the SaaS platform (the user places the order), the order module generates the corresponding order information and sends the order information (step 301, order information) to the controller module.

The controller module sends the call instruction (step 302a, call instruction) to the application library according to the call instruction and the delivery instruction corresponding to the order information, and sends the delivery instruction (step 302b, delivery instruction) to the delivery module.

The delivery module sends an instruction for information extraction (step 303, information extraction) to the application library according to the delivery instruction corresponding to the call instruction, and the application library sends the description information (step 304, description information) of the designated application prepared according to the call instruction to the delivery module, and the delivery module takes the delivery identifier carried in the delivery instruction and the description information obtained from the application library as the relevant information of the designated application (step 305, sending the relevant information) to be sent to the application delivery module in the PaaS platform.

The delivery module obtains the application model of the designated application according to the relevant information, obtains model information (step 306, model information) from the application model, determines the resource information required by the designated application according to the model information, and sends the resource information (step 307, resource information) to the intelligent resource scheduling module.

The intelligent resource scheduling module generates the corresponding resource demand information (step 308, resource demand information) by utilizing the resource information required by the designated application, and sends the resource demand information to the underlying resource. The underlying resource queries whether the remaining resource meets the resource requirement in the resource demand information through the resource demand information, and feeds back corresponding resource feedback information (step 309, resource feedback information, it is assumed that the resource feedback information indicates that the resource requirement for the designated application can be met, and carries the resource allocated for the designated application). The intelligent resource scheduling module generates corresponding resource deployment information according to the resource feedback information, and sends the resource deployment information to the application delivery module (step 310, resource deployment information).

The application delivery module utilizes the application model to deploy the designated application in the resource (a resource included in the resource deployment information) allocated to it to generate the designated application, and takes a URL address of the designated application as the deployment result to be sent to the delivery module in the SaaS platform (step 311, sending the deployment result).

The delivery module in the SaaS platform generates the corresponding feedback information according to the deployment result, and sends the feedback information to the user (312, feedback information), so that the user obtains the URL address of the designated application, and accesses the designated application through the URL address.

It should be noted that the module division mode of the above SaaS platform and the PaaS platform is not limited to the mode shown in FIG. 3, and may also include other modes, for example, the three modules in the SaaS platform are combined into one module, the order module and the controller module are combined into one module, or the controller module and the delivery module are combined into one module, or a certain module is divided into a plurality of modules, etc.

Figure 4:
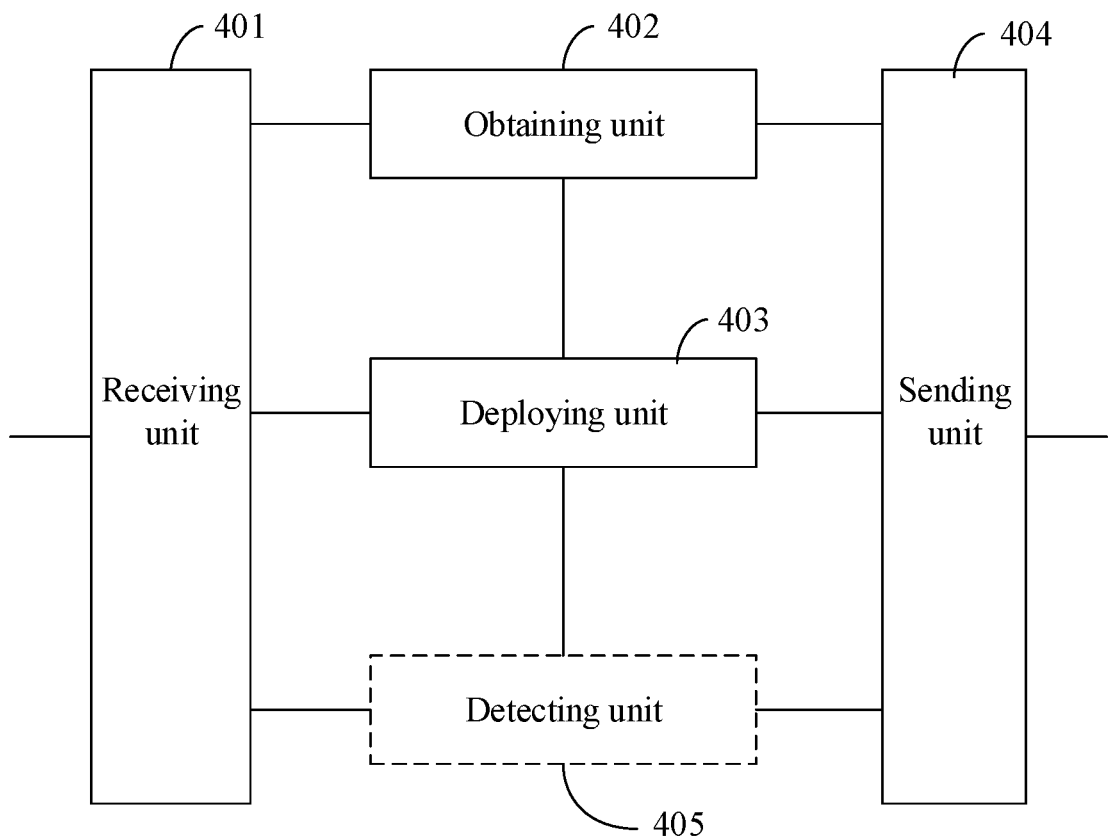
FIG. 4 is a schematic structural diagram of application deployment in a SaaS platform at a SaaS side according to an embodiment of the disclosure.

Based on the same inventive concept, an embodiment of the disclosure provides an apparatus for application deployment in a software-as-a-service platform, applied to the software-as-a-service (SaaS) platform. The SaaS platform exists in a platform-as-a-service (PaaS) platform in an application form. The specific implementation of the method for application deployment in the software-as-a-service platform of the apparatus may refer to the description of the method embodiment part on the SaaS platform side, and the repetitions are omitted. Please refer to FIG. 4, the apparatus includes:

a receiving unit 401, configured to receive order information of a user, where the order information includes an application identifier and delivery identifier of a designated application designated by the user, and the delivery identifier is configured to indicate a delivery mode of the designated application;

an obtaining unit 402, configured to determine relevant information for deploying the designated application according to the order information, where the relevant information includes the delivery identifier;

a deploying unit 403, configured to send the relevant information to the PaaS platform, so that the PaaS platform performs the application deployment through a corresponding application model according to the relevant information so as to obtain the designated application, and sends a deployment result of the designated application to the SaaS platform; and a sending unit 404, configured to receive the deployment result, and provide corresponding feedback information to the user according to the deployment result.

In one possible implementation, the obtaining unit 402 is configured to:

generate a call instruction according to the order information;

send the call instruction to an application library, so that the application library calls description information of the designated application, where the application library is shared by the SaaS platform and the PaaS platform; and obtain the description information from the application library, and use the description information and the delivery identifier as the relevant information.

In one possible implementation, the obtaining unit 402 is further configured to:

determine a user operation performed by the user according to an operation identifier carried in the order information, where the user operation includes a purchase operation and a trial operation.

In one possible implementation, the obtaining unit 402 is further configured to:

before determining the relevant information for deploying the designated application, if it is determined that the user operation is the purchase operation, return to a payment page, so that the user pays on the payment page; and review the order information after it is determined that the user completes payment on the payment page.

In one possible implementation, the sending unit 404 is further configured to:

when the delivery identifier is address delivery, the deployment result being an application address of the designated application locally deployed, take the application address as the feedback information to be provided to the user, so that the user accesses the application through the application address;

when the delivery identifier is mirror program delivery, the deployment result being a mirror file of the designated application, take the mirror file as the feedback information to be provided to the user, so that the user installs the designated application in a desired environment through the mirror file; and when the delivery identifier is designated environment delivery, the order information further including an interface address of a container designated by the user; and the deployment result being that the designated application has been deployed in the container, take a condition that the designated application has been deployed in the container as the feedback information to be provided to the user so as to notify the user that the designated application has been deployed in the container.

In one possible implementation, the obtaining unit 402 is further configured to:

when the delivery identifier is the address delivery, if an application type of the designated application is a multi-tenant application, create a corresponding user account and password when receiving the next new order for purchasing the designated application; and return the user account and password and an address of the designated application to the user corresponding to the new order.

In one possible implementation, the obtaining unit 402 is further configured to:

automatically allocate the user account and password to the user corresponding to the new order; and encapsulate the user account and password in a tenant interface of the designated application.

In one possible implementation, the apparatus further includes a detecting unit 405, and the detecting unit 405 is configured to:

periodically detect a validity period of the user account; and when it is detected that the validity period of the user account has expired and a fee is not renewed, set the user account to be in an invalid state, so that the user account cannot be accessed.

Figure 5:
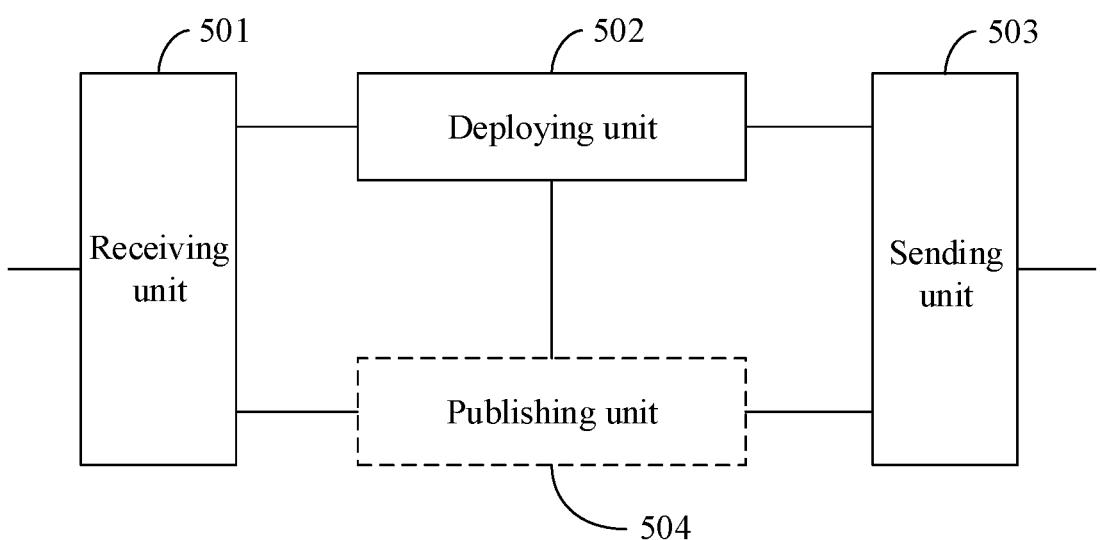
FIG. 5 is a schematic structural diagram of application deployment in a SaaS platform at a PaaS side according to an embodiment of the disclosure.

Based on the same inventive concept, an embodiment of the disclosure provides an apparatus for application deployment in a software-as-a-service platform, applied to a platform-as-a-service (PaaS) platform. The PaaS platform includes a software-as-a-service (SaaS) platform existing in an application form. The specific implementation of the method for application deployment in the software-as-a-service platform of the apparatus may refer to the description of the method embodiment part on the PaaS platform side, and the repetitions are omitted. Please refer to FIG. 5, the apparatus includes:

a receiving unit 501, configured to receive relevant information for deploying a designated application sent by the SaaS platform, where the designated application is determined from order information received from the SaaS platform, and the relevant information includes a delivery identifier of the designated application;

a deploying unit 502, configured to perform the application deployment through a corresponding application model according to the relevant information so as to obtain the designated application; and a sending unit 503, configured to send a deployment result of the designated application to the SaaS platform, so that the SaaS platform provides corresponding feedback information to a user corresponding to the order information according to the deployment result.

In one possible implementation, the deploying unit 502 is configured to:

obtain the application model from an application model library according to the relevant information;

determine a deployment location of the designated application according to the delivery identifier; and deploy the designated application in the deployment location through the application model so as to obtain the designated application.

In one possible implementation,
when the delivery identifier is address delivery or mirror program delivery, the deployment location is a local location; and
when the delivery identifier is designated environment delivery, the relevant information further including an interface address of a container designated by the user, and the deployment location being the container.

In one possible implementation, the deploying unit 502 is further configured to:
when the delivery identifier is the mirror program delivery, generate a corresponding mirror file after obtaining the designated application.

In one possible implementation, the deploying unit 502 is further configured to:
when the delivery identifier is the designated environment delivery, deploy the designated application in the container through the application model so as to obtain the designated application.

In one possible implementation, the deploying unit 502 is further configured to:
when the delivery identifier is the address delivery, extract resource information required by the designated application from the application model;
judge whether a remaining resource in an underlying resource meets a resource requirement in the resource information; and
if yes, obtain a resource corresponding to the resource information from the underlying resource, and deploy the designated application on the resource so as to obtain the designated application.

In one possible implementation, the deploying unit 502 is further configured to:
if the remaining resource does not meet the resource requirement in the resource information, return error information to the SaaS platform so as to prompt that the designated application deployment fails.

In one possible implementation, the apparatus further includes a publishing unit 504, and the publishing unit 504 is configured to:
after the application model of the designated application is created, push the designated application to an application library, so that the designated application is published in an application store of a corresponding merchant.

In one possible implementation, the publishing unit 504 is further configured to:
receive merchant information registered in the SaaS platform by the merchant who creates the application model and configuration information of the created application store; and
configure a delivery environment corresponding to the application store in the PaaS platform according to the merchant information and the configuration information of the application store, and associate the application store.

Based on the same inventive concept, an embodiment of the disclosure provides an apparatus for application deployment in a software-as-a-service platform, including: at least one processor, and
a memory connected with the at least one processor, wherein
the memory stores an instruction capable of being executed by the at least one processor, and the at least one processor executes the method for the application deployment in the software-as-a-service platform on the above SaaS side or the PaaS side by executing the instruction stored in the memory.

Based on the same inventive concept, an embodiment of the disclosure further provides a readable storage medium, including:
a memory, wherein
the memory is configured to store an instruction, and the instruction, when executed by a processor, enables an apparatus including the readable storage medium to complete the method for the application deployment in the software-as-a-service platform on the above SaaS side or the PaaS side.

The skilled in the art should understand that the embodiments of the disclosure may be provided as a method, a system or a computer program product. Therefore, the embodiments of the disclosure can adopt forms of full hardware embodiments, full software embodiments, or embodiments combining software and hardware aspects. Moreover, the embodiments of the disclosure can adopt a form of the computer program products implemented on one or more computer available storage mediums (including but not limited to a disk memory, CD-ROM, an optical memory and the like) containing computer available program codes.

The embodiments of the disclosure are described with reference to flow diagrams and/or block diagrams of the methods, the devices (systems), and computer program products according to the embodiments of the disclosure. It should be understood that each flow and/or block in the flow diagrams and/or the block diagrams and combinations of the flows and/or the blocks in the flow diagrams and/or the block diagrams can be implemented by computer program instructions. These computer program instructions may be provided to a processor of a general-purpose computer, a special-purpose computer, an embedded processing machine or other programmable data processing devices to generate a machine, such that the instructions, when executed by the processor of the computer or other programmable data processing devices, generate an apparatus for implementing functions specified in one or more flows in the flow diagrams and/or one or more blocks in the block diagrams.

These computer program instructions may also be stored in a computer readable memory which can guide the computer or other programmable data processing devices to work in a specific mode, thus the instructions stored in the computer readable memory generate an article of manufacture that includes a commander apparatus that implement the functions specified in one or more flows in the flow diagrams and/or one or more blocks in the block diagrams.

These computer program instructions may also be loaded to the computer or other programmable data processing devices, so that a series of operating steps are executed on the computer or other programmable devices to generate computer-implemented processing, such that the instructions executed on the computer or other programmable devices provide steps for implementing the functions specified in one or more flows in the flow diagrams and/or one or more blocks in the block diagrams.

Obviously, those skilled in the art can make various modifications and variations to the disclosure without departing from the spirit and scope of the disclosure. In this way, if these modifications and variations of the disclosure fall within the scope of the claims of the disclosure and their equivalent art, the disclosure also intends to include these modifications and variations.

What is claimed is:

1. A method for application deployment in a software-as-a-service (Saas) platform, applied to the SaaS platform, wherein the SaaS platform exists in a platform-as-a-service (PaaS) platform in an application form, and the method comprises:

receiving order information of a user, wherein the order information comprises an application identifier and delivery identifier of a designated application designated by the user, and the delivery identifier is configured to indicate a delivery mode of the designated application;

determining relevant information for deploying the designated application according to the order information, wherein the relevant information comprises the delivery identifier;

sending the relevant information to the PaaS platform, so that the PaaS platform performs the application deployment according to an application model corresponding to the relevant information so as to obtain the designated application, and sends a deployment result of the designated application to the SaaS platform; and receiving the deployment result, and providing corresponding feedback information to the user according to the deployment result;

wherein the providing the corresponding feedback information to the user according to the deployment result comprises:

when the delivery identifier is address delivery, the deployment result being an application address of the designated application locally deployed, taking the application address as the feedback information to be provided to the user, so that the user accesses the application through the application address;

when the delivery identifier is mirror program delivery, the deployment result being a mirror file of the designated application, taking the mirror file as the feedback information to be provided to the user, so that the user installs the designated application in a desired environment through the mirror file; and when the delivery identifier is designated environment delivery, the order information further comprising an interface address of a container designated by the user; and the deployment result being that the designated application has been deployed in the container, taking a condition that the designated application has been deployed in the container as the feedback information to be provided to the user so as to notify the user that the designated application has been deployed in the container.

2. The method according to claim 1, wherein the determining the relevant information for deploying the designated application according to the order information comprises:

generating a call instruction according to the order information;

sending the call instruction to an application library, so that the application library calls description information of the designated application, wherein the application library is shared by the SaaS platform and the PaaS platform; and obtaining the description information from the application library, and using the description information and the delivery identifier as the relevant information.

3. The method according to claim 1, wherein before receiving the deployment result, and providing the corresponding feedback information to the user according to the deployment result, the method further comprises:

determining a user operation performed by the user according to an operation identifier carried in the order information, wherein the user operation comprises a purchase operation and a trial operation.

4. The method according to claim 3, wherein after the determining the user operation performed by the user, the method further comprises:

before determining the relevant information for deploying the designated application, if it is determined that the user operation is the purchase operation, returning to a payment page, so that the user pays on the payment page; and reviewing the order information after it is determined that the user completes payment on the payment page.

5. The method according to claim 1, wherein after receiving the deployment result, and providing the corresponding feedback information to the user according to the deployment result, the method further comprises:

when the delivery identifier is the address delivery, if an application type of the designated application is a multi-tenant application, creating a corresponding user account and password when receiving a next new order for purchasing the designated application; and returning the user account and password and an address of the designated application to the user corresponding to the new order.

6. The method according to claim 5, wherein the creating the corresponding user account and password comprises:

automatically allocating the user account and password to the user corresponding to the new order; and encapsulating the user account and password in a tenant interface of the designated application.

7. The method according to claim 5, wherein after returning the user account and password and the address of the designated application to the user corresponding to the new order, the method further comprises:

periodically detecting a validity period of the user account; and when it is detected that the validity period of the user account has expired and a fee is not renewed, setting the user account to be in an invalid state, to make the user account be unaccessible.

8. A method for application deployment in a software-as-a-service (Saas) platform, applied to a platform-as-a-service (PaaS) platform, wherein the PaaS platform comprises the SaaS platform existing in an application form, and the method comprises:

receiving relevant information for deploying a designated application sent by the SaaS platform, wherein the designated application is determined from order information received from the SaaS platform, and the relevant information comprises a delivery identifier of the designated application;

performing the application deployment through a corresponding application model according to the relevant information so as to obtain the designated application; and sending a deployment result of the designated application to the SaaS platform, so that the SaaS platform provides corresponding feedback information to a user corresponding to the order information according to the deployment result;

wherein sending a deployment result of the designated application to the SaaS platform, so that the SaaS platform provides corresponding feedback information to a user corresponding to the order information according to the deployment result, comprises:

when the delivery identifier is address delivery, sending the deployment result, which is an application address of the designated application locally deployed, to the SaaS platform, to enable the SaaS platform to take the application address as the feedback information to be provided to the user, so that the user accesses the application through the application address;

when the delivery identifier is mirror program delivery, sending the deployment result, which is a mirror file of the designated application, to the SaaS platform, to enable the Saas platform to take the mirror file as the feedback information to be provided to the user, so that the user installs the designated application in a desired environment through the mirror file; and when the delivery identifier is designated environment delivery and the order information further comprises an interface address of a container designated by the user, sending the deployment result, which indicates that the designated application has been deployed in the container, to the SaaS platform, to enable the SaaS platform to take a condition that the designated application has been deployed in the container as the feedback information to be provided to the user so as to notify the user that the designated application has been deployed in the container.

9. The method according to claim 8, wherein the performing the application deployment through the corresponding application model according to the relevant information so as to obtain the designated application comprises:

obtaining the application model from an application model library according to the relevant information;

determining a deployment location of the designated application according to the delivery identifier; and deploying the designated application in the deployment location through the application model so as to obtain the designated application.

10. The method according to claim 9, wherein when the delivery identifier is address delivery or mirror program delivery, the deployment location is a local location; and when the delivery identifier is designated environment delivery, the deployment location is the container.

11. The method according to claim 10, wherein after obtaining the designated application, the method further comprises:

when the delivery identifier is the mirror program delivery, generating a corresponding mirror file after obtaining the designated application.

12. The method according to claim 10, wherein the deploying the designated application in the deployment location through the application model so as to obtain the designated application comprises:

when the delivery identifier is the designated environment delivery, deploying the designated application in the container through the application model so as to obtain the designated application.

13. The method according to claim 10, wherein the deploying the designated application in the deployment location through the application model so as to obtain the designated application comprises:

when the delivery identifier is the address delivery, extracting resource information required by the designated application from the application model;

judging whether a remaining resource in an underlying resource meets a resource requirement in the resource information; and if yes, obtaining a resource corresponding to the resource information from the underlying resource, and deploying the designated application on the resource, so as to obtain the designated application.

14. The method according to claim 13, wherein after judging whether the remaining resource in the underlying resource meets the resource requirement in the resource information, the method further comprises:

if the remaining resource does not meet the resource requirement in the resource information, returning error information to the SaaS platform so as to prompt that the designated application deployment fails.

15. The method according to claim 8, wherein before performing the application deployment through the corresponding application model according to the relevant information so as to obtain the designated application, the method further comprises:

after the application model of the designated application is created, pushing the designated application to an application library, so that the designated application is published in an application store of a corresponding merchant.

16. The method according to claim 15, wherein before pushing the designated application to the application library, the method further comprises:

receiving merchant information registered in the SaaS platform by the merchant who creates the application model and configuration information of the created application store; and configuring a delivery environment corresponding to the application store in the Paas platform according to the merchant information and the configuration information of the application store, and associating the application store.

17. The method according to claim 15, wherein after pushing the designated application to the application library, the method comprises:

receiving a publish instruction of the designated application, and the publish instruction being configured to publish the designated application in the application store;

parsing a description file of the designated application to obtain components contained in the description file and a logical relationship of calling among the components; and sequentially starting services corresponding to a respective one of the components according to the logical relationship.

18. An apparatus for application deployment in a software-as-a-service platform, comprising:

at least one processor, and a memory connected with the at least one processor, wherein the memory stores an instruction capable of being executed by the at least one processor, and the at least one processor executes the method according to claim 8 by executing the instruction stored in the memory.

19. An apparatus for application deployment in a software-as-a-service (SaaS) platform, applied to the SaaS platform, wherein the SaaS platform exists in a platform-as-a-service (PaaS) platform in an application form, comprising:

at least one processor, and a memory connected with the at least one processor, wherein the memory stores an instruction capable of being executed by the at least one processor, and the at least one processor executes the instruction stored in the memory to perform a method comprising:

receiving order information of a user, wherein the order information comprises an application identifier and delivery identifier of a designated application designated by the user, and the delivery identifier is configured to indicate a delivery mode of the designated application;

determining relevant information for deploying the designated application according to the order information, wherein the relevant information comprises the delivery identifier;

sending the relevant information to the PaaS platform, so that the PaaS platform performs the application deployment according to an application model corresponding to the relevant information so as to obtain the designated application, and sends a deployment result of the designated application to the SaaS platform; and receiving the deployment result, and providing corresponding feedback information to the user according to the deployment result;

wherein the providing the corresponding feedback information to the user according to the deployment result comprises:

when the delivery identifier is address delivery, the deployment result being an application address of the designated application locally deployed, taking the application address as the feedback information to be provided to the user, so that the user accesses the application through the application address;

when the delivery identifier is mirror program delivery, the deployment result being a mirror file of the designated application, taking the mirror file as the feedback information to be provided to the user, so that the user installs the designated application in a desired environment through the mirror file; and when the delivery identifier is designated environment delivery, the order information further comprising an interface address of a container designated by the user; and the deployment result being that the designated application has been deployed in the container, taking a condition that the designated application has been deployed in the container as the feedback information to be provided to the user so as to notify the user that the designated application has been deployed in the container.

\* \* \* \* \*